July 8, 1969   D. L. MOTYCKA   3,454,227
FREE FLOATING ARTICULATE EJECTOR NOZZLE
Filed Aug. 19, 1966
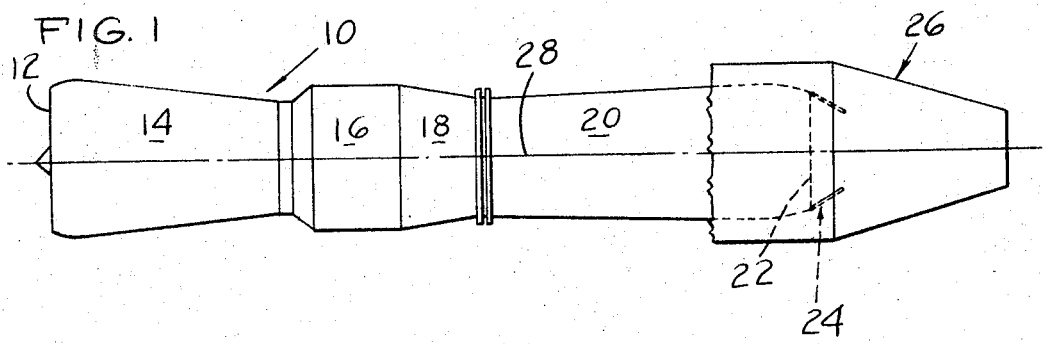
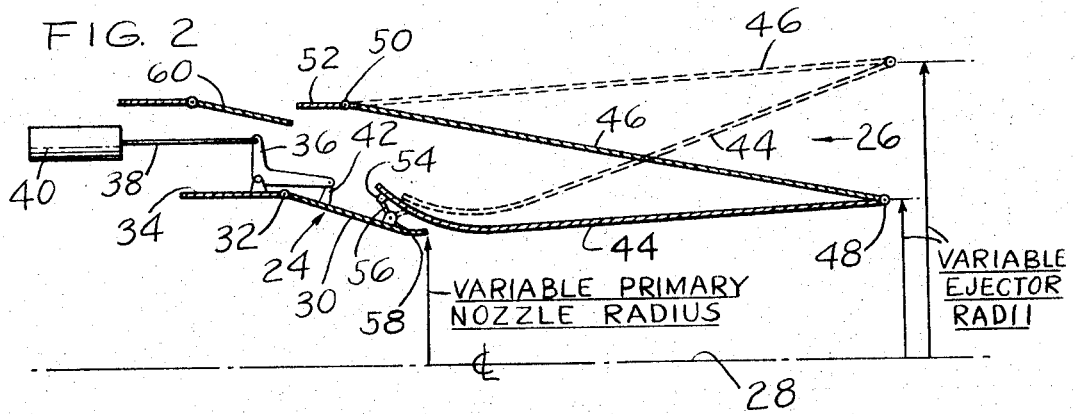
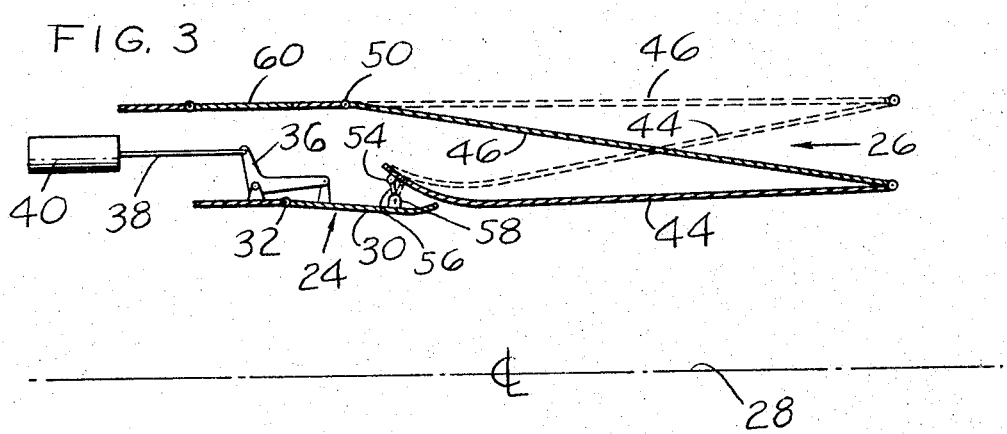
INVENTOR
DAVID L. MOTYCKA
BY  *Fishman & Van Kirk*
ATTORNEYS

United States Patent Office 3,454,227
Patented July 8, 1969

3,454,227
FREE FLOATING ARTICULATE EJECTOR NOZZLE
David L. Motycka, Glastonbury, Conn., assignor to United Aircraft Corporation, East Hartford, Conn., a corporation of Delaware
Filed Aug. 19, 1966, Ser. No. 573,508
Int. Cl. B64c 15/08; B05b 1/26
U.S. Cl. 239—265.39     14 Claims

ABSTRACT OF THE DISCLOSURE

Nozzle structure for gas turbine aircraft engines including a positively actuated, variable area, primary exhaust nozzle and a free floating ejector nozzle. The ejector nozzle structure is positioned downstream, in the direction of exhaust gas flow, from the primary nozzle and is comprised of inner and outer flaps which are hinged together at their downstream ends; the upstream end of the outer flap being hinged to the engine or aircraft structure and the upstream end of the inner flap being attached to the primary nozzle by a floating connection.

---

This invention relates to exhaust structure for an aircraft jet engine. More particularly, this invention relates to a free floating articulate ejector nozzle for use with an aircraft jet engine.

As the interest in high Mach number supersonic jet aircraft increases, provisions must be made for the effective and efficient operation of the aircraft power plant over a wide range of subsonic and supersonic speeds. Attempts must be made to provide optimum exhaust nozzle configurations for both subsonic and supersonic speeds with the capacity also to make the proper adjustments in nozzle structure to accommodate both afterburning and nonafterburning operation at both subsonic and supersonic speeds. The various exhaust nozzle configurations preferred for subsonic and supersonic flight, with and without afterburning, are well known to those skilled in the art.

Ejector nozzle structure and blow in doors have been proposed as an effective approach to provide an appropriately configured exhaust structure adaptable for use over a wide range of subsonic and supersonic speeds. One example of such ejector and blow in door structure is shown in U.S. Patent No. 3,057,150. To realize the best performance of which an ejector nozzle is capable, the contour of the inner surface of the ejector nozzle should start in close proximity to the exit plane of the primary nozzle, one of the purposes of this close proximity being to provide a relatively smooth wall contour for the gases flowing through the exhaust structure. The placing of the inner surface of the ejector structure in close proximity to the exit plane of the primary nozzle requires that the position of the inner surface of the ejector structure be variable along with variations in the size of the primary nozzle structure in order to maintain the desired smooth wall contour. The necessary movement or adjustment of the ejector structure can be accomplished through the use of an actuating system and mechanism specifically provided for the ejector structure. However, employing a separate actuator structure or mechanism for the ejector structure necessarily involves the undesirable feature of increasing the aircraft weight by the weight of the actuator mechanism.

In the present invention the highly desirable feature of an infinitely variable ejector structure is realized without the employment of and weight disadvantage of a separate actuating mechanism for the ejector structure. A free floating articulate ejector nozzle is connected by a tie link to the primary nozzle, and movement of the primary nozzle is transmitted through the tie link to the ejector structure to actuate the ejector structure to the desired position corresponding to the position of the primary nozzle.

The ejector structure in the present invention comprises inner and outer flaps which are hinged together at their downstream ends, the upstream end of the outer flap being hinged to the engine structure or aircraft structure and the upstream end of the inner flap being connected to the tie link. The ejector structure is free floating and uses the primary nozzle as both an actuator and as a limiting anchor. The flaps are movable with respect to each other so that the inner contour of the ejector structure can be varied to continuously provide a smooth flow contour for exhaust gases. Additionally, the entire ejector structure responds to pressure changes across the ejector to vary the exhaust area of the ejector structure in response to aerodynamic loadings so that the ejector structure tends to seek the proper position for optimum operation under varying pressure conditions. The outer flap provides a low drag fairing and also acts as the counteracting pressure surface which holds the inner surface in position. An example of prior art nozzle structure which is not free floating and which is burdened with the weight of multiple actuating systems for various parts of the nozzle may be seen in United States Patents Nos. 3,214,904 and 3,214,905.

Accordingly, one object of the present invention is to provide novel exhaust structure for an aircraft jet engine.

Another object of the present invention is to provide novel exhaust structure for an aircraft jet engine suitable for use over a wide range of subsonic and supersonic speeds.

Still another object of the present invention is to provide novel variable area exhaust nozzle structure for an aircraft jet engine.

Still another object of the present invention is to provide novel ejector nozzle exhaust structure for an aircraft jet engine.

Still another object of the present invention is to provide novel variable ejector nozzle exhaust structure for an aircraft jet engine.

Still another object of the present invention is to provide a novel light weight variable ejector nozzle structure for an aircraft jet engine.

Still another objects of the present invention is to provide a novel free floating variable ejector nozzle structure for an aircraft jet engine.

Still another object of the present invention is to provide a novel variable ejector nozzle structure for an aircraft jet engine wherein the ejector nozzle is at least partly actuated by aerodynamic forces.

Other objects and advantages will be apparent from the following detailed description and drawings.

In the drawings, wherein similar elements are numbered alike in the several figures:

FIGURE 1 is an elevation view of an aircraft jet engine employing the ejector nozzle of this invention.

FIGURE 2 is a sectional elevation view of a detailed part of the ejector nozzle of FIGURE 1 showing an arrangement for nonafterburning operation.

FIGURE 3 is a view similar to FIGURE 2 showing an arrangement for afterburning operation.

Referring now to FIGURE 1, a gas turbine engine 10 has an air inlet section 12, a compressor section 14 downstream of the air inlet section, a combustion chamber or burner section 16 downstream of the compressor section, a turbine section 18 downstream of the burner section, and an afterburner section 20 downstream of the turbine section. The discharge end 22 of engine 10 has a primary variable area exhaust nozzle 24 and a variable area ejector nozzle structure 26 associated therewith. The upstream end of ejector 26 may be fixed to engine structure or airframe structure as desired. Engine 10 is of generally circular cross section about axis 28 except that ejector nozzle structure 26 may be two dimensional.

With respect to the general operation of engine 10, air enters air inlet section 12, and it is then compressed in compressor section 14. The compressed air is then heated in burner section 16, and energy is extracted from the heated air in turbine section 18 to drive compressor section 14. The air then passes rearwardly through exhaust nozzle 24 and ejector nozzle structure 26 to atmosphere for the generation of forward thrust. The gases passing rearwardly from turbine section 18 may also be increased in energy content by the burning of additional fuel therein in afterburner section 20 for the generation of additional forward thrust.

Primary variable area exhaust nozzle 24 and ejector nozzle structure 26 combine in the present invention to provide highly effective and efficient operation of engine 10 over a wide range of subsonic and supersonic speeds, both with and without afterburning.

Referring now to FIGURE 2, details of primary exhaust nozzle 24 and ejector nozzle structure 26 are shown. The sectional view of FIGURE 2 shows only the part of the structure above axis 28, and it will be understood that the engine exhaust structure is substantially symmetric about axis 28 so that substantially identical structure would be seen below axis 28 in a full sectional view. Also, ejector nozzle structure 26 will be described as a two dimensional ejector nozzle, but it will be expressly understood that ejector nozzle structure of circular cross section can also be used.

As seen in FIGURE 2, primary variable area exhaust nozzle 24 may be comprised of a series of individual flap segments 30, each of which is connected at a pivot 32 to engine structure 34. A bell crank 36 is pivotably mounted on engine structure 34, one end of bell crank 36 being connected through an actuating rod 38 to an actuating cylinder 40, and the other end of bell crank 36 is connected through a pivotable link 42 to a flap segment 30. It is to be understood that there is preferably a bell crank 36 and associated actuating structure for each of the flap segments 30. As shown in FIGURE 2, the downstream end of primary exhaust nozzle 24 is in a position for small nozzle radius and hence small exhaust area for nonafterburning operation.

Still referring to FIGURE 2, ejector nozzle structure 26 includes an inner shroud or flap 44 and an outer shroud or flap 46, the downstream ends of flaps 44 and 46 being pivotably connected together by pivot 48. The upstream end of outer flap 46 is connected by a pivot 50 to engine or aircraft structure 52. The upstream end of flap 44 is pivotably connected via a pivot 54 to a floating tie link 56 which is in turn connected by a pivot 58 to a flap segment 30 of the primary nozzle.

Ejector nozzle structure 26 is shown in the solid line in FIGURE 2 in a subsonic operating position in conjunction with the nonafterburning position of primary nozzle 24. The start of the operational part of the contour of inner flap 44 is in close proximity to the exit from primary nozzle 24 and there is a relatively smooth contour between the primary nozzle exit and the start of the operation part of the contour of inner flap 44 to provide optimum performance for the ejector nozzle.

As stated above, the solid line structure for ejector nozzle 26 as shown in FIGURE 2 depicts a subsonic operating condition, and the ejector nozzle is in a state of aerodynamic balance with outer flap 46 providing a low drag fairing and also serving as the counteracting pressure surface on which the atmosphere acts to balance inner flap 44 in position. In the event that the pilot changes his speed setting to call for increased subsonic speed or supersonic speed, the ratio of total pressure in the engine exhaust stream within ejector nozzle 26 to the static pressure of the ambient atmosphere increases rapidly. Flaps 44 and 46 are both free to pivot about their upstream ends so that the flaps are, in effect, free floating and balanced by aerodynamic forces. The increase in pressure ratio across ejector nozzle 26 causes flaps 44 and 46 to pivot counterclockwise about their upstream ends to drive the floating ejector nozzle to a more open position as shown in the dotted lines in FIGURE 2 for operation at increased or supersonic speeds. The downstream end of the ejector may assume any position between the ejector radii shown, depending on aerodynamic forces. As was the case with the showing of flaps 44 and 46 in the solid line position, the operating contour of flap 44 in the dotted position also originates in close proximity to the end of primary nozzle 24. Tie link 56 is free to move to accommodate movement of flaps 44 and 46, and link 56 also moves to a new position as shown by the dotted lines. A self actuating blow in door structure 60 such as is described in U.S. Patent No. 3,057,150 may be included to provide auxiliary flow for improved subsonic performance.

Referring now to FIGURE 3, variable area primary exhaust nozzle 24 is shown in the full open position for afterburning operation. Nozzle 24 is driven to the full open afterburning position by delivering an appropriate signal to actuating cylinder 40 to cause bell crank 36 to rotate counterclockwise and thus rotate flaps 30 counterclockwise about pivots 32. The solid line position of flaps 44 and 46 constitutes a subsonic operating position for ejector nozzle 26 in conjunction with the full open afterburning position of primary nozzle 24. The dotted line position of flaps 44 and 46 corresponds to an increased speed or supersonic speed position for ejector nozzle 26 in conjunction with the full open afterburning position of primary nozzle 24. In both the full line and dotted line positions of inner flap 44 there is a close proximity maintained between the flap 44 and the exit from primary nozzle 24 to obtain optimum ejector performance as described above.

It will be observed that the separation between inner flap 44 and outer flap 46 in the FIGURE 3 embodiment is less than the separation between these inner and outer flaps in the FIGURE 2 embodiment. The flaps 44 and 46 are pivotable with respect to each other by virtue of their pivoted connection 48 at their downstream ends, and this freedom of motion between the two flaps allows for the maintaining of a relatively smooth contour both along the outer surface of flap 46 and along the inner surface of flap 44 from nozzle 24. Flaps 44 and 46 are caused to move relative to each other through the motion of tie link 56 as flaps 30 are pivoted either counterclockwise to go from the FIGURE 2 configuration to the FIGURE 3 configuration or clockwise to go from the FIGURE 3 configuration to the FIGURE 2 configuration.

As in the FIGURE 2 embodiment, the ejector nozzle structure in FIGURE 3 is aerodynamically balanced. A change in the pressure ratio across the ejector nozzle, whether by a change in engine speed or otherwise, will cause the entire ejector nozzle to move inwardly or outwardly about the upstream pivots 50 and 54 to assume a new position of aerodynamic balance.

Regardless of whether the exhaust structure has assumed the general nonafterburning configuration of FIGURE 2 or the general afterburning configuration of FIGURE 3, floating tie link 56 acts in both cases as both a connector to supply actuating signals or forces from flaps 30 to ejector nozzle 26 and as a limit stop to prevent excessive opening movement of the ejector nozzle. Of course, a separate physical stop could be employed to limit opening or closing of ejector 26, and a circumferential tie rod between the several segments could be employed in the case of a circular cross section ejector made up of pairs of flaps disposed in a circular array. Actuation of primary nozzle 24 from actuator 40 is transmitted through tie link 56 to ejector nozzle 26 so that no separate actuating mechanism is required for the ejector nozzle. Rather, the ejector nozzle is essentially free floating and the weight of a separate actuating system is eliminated by transmitting forces through tie link 56 and making the nozzle free floating to respond to aerodynamic forces.

What is claimed is:

1. A variable area exhaust for an aircraft jet engine including:
   first variable nozzle means defining a variable area passage for exhaust gases from said engine;
   free floating second variable nozzle means extending downstream of said first variable area nozzle means;
   said second variable nozzle means including first flap means pivotably connected to engine structure at the upstream end of said first flap means and second flap means pivotably connected at the downstream end of said second flap means to said first flap means at the downstream end of said first flap means;
   connecting means connecting the upstream end of said second flap means to said first variable nozzle means; and
   actuating means for moving said first variable nozzle means to vary the area of said first nozzle means, movement of said first variable nozzle means being transmitted through said connecting means to said second flap means to vary the area of said second nozzle means.

2. A variable area exhaust for an aircraft jet engine as in claim 1 wherein said free floating second variable nozzle means is also responsive to changes in the relationship between pressures across said free floating second variable nozzle means to vary the area thereof.

3. A variable area exhaust for an aircraft jet engine as in claim 1 wherein said first and second flap means of said second variable nozzle means are free to move relative to each other in response to movement of said first variable nozzle means.

4. A variable area exhaust for an aircraft jet engine as in claim 1 wherein said second variable nozzle means is an ejector nozzle.

5. A variable area exhaust for an aircraft jet engine including:
   variable primary nozzle means defining a variable primary air passage for exhaust gases from said engine;
   ejector nozzle structure connected to said engine and extending downstream of said primary nozzle means;
   said ejector nozzle structure being free floating and including a plurality of first flap means, each of said first flap means being pivotably connected to said engine at the upstream end of said first flap means, and a corresponding plurality of second flap means, each of said second flap means being pivotably connected at the downstream end thereof to the downstream end of a corresponding first flap means; said first and second flap means being free to move in response to aerodynamic loadings;
   connecting means extending from said first variable nozzle means to the upstream end of said second flap means; and
   actuating means for moving said primary nozzle means to vary the area of said primary air passage, movement of said primary nozzle means constituting a signal transmitted through said connecting means to said second flap means to vary the area of said ejector nozzle, said signal transmitted to said second flap means and said aerodynamic loadings being the only actuating forces for said ejector nozzle structure.

6. A variable area exhaust for an aircraft jet engine as in claim 5 wherein said first and second flap means of said ejector nozzle structure are free to move relative to each other in response to movement of said primary nozzle means.

7. A variable area exhaust for an aircraft jet engine as in claim 5 wherein said aerodynamic loading includes changes in the relationship between pressures across said ejector nozzle structure, said first and second flap means moving together in response to said pressure changes.

8. A variable area exhaust for an aircraft jet engine including:
   first variable nozzle means defining a variable area passage for exhaust gases from said engine;
   free floating second variable nozzle means extending downstream of said first variable area nozzle means;
   said second variable nozzle means being an articulated nozzle including first flap means pivotally connected to engine structure at the upstream end of said first flap means and second flap means pivotally connected at the downstream end of said second flap means to said first flap means at the downstream end of said first flap means;
   connecting means connecting the upstream end of said second flap means to said first variable nozzle means, said connecting means being a floating connection between said upstream end of said second flap means and said first variable nozzle means; and
   actuating means for moving said first variable nozzle means to vary the area of said first nozzle means, movement of said first variable nozzle means being transmitted through said connecting means to said second flap means to vary the area of said second nozzle means.

9. A variable area exhaust for an aircraft jet engine as in claim 8 wherein said free floating second variable nozzle means is also responsive to changes in the relationship between pressures across said free floating second variable nozzle means to vary the area thereof.

10. A variable area exhaust for an aircraft jet engine as in claim 8 wherein said first and second flap means of said second varaible nozzle means are free to move relative to each other in response to movement of said first variable nozzle means.

11. A variable area exhaust for an aircraft jet engine as in claim 8 wherein said second variable nozzle means is an ejector nozzle.

12. A variable area exhaust for an aircraft jet engine including:
   variable primary nozzle means defining a variable primary air passage for exhaust gases from said engine;
   ejector nozzle structure connected to said engine and extending downstream of said primary nozzle means;
   said ejector nozzle structure being articulated and free floating and including a plurality of first flap means, each of said first flap means being pivotally connected to said engine at the upstream end of said first flap means, and a corresponding plurality of second flap means, each of said second flap means being pivotally connected at the downstream end thereof to the downstream end of a corresponding first flap means; said first and second flap means being free to move in response to aerodynamic loadings;
   connecting means extending from said first variable nozzle means to the upstream end of said second flap means, said connecting means being a floating connection between said upstream end of said second flap means and said variable primary nozzle means; and
   actuating means for moving said primary nozzle to vary the area of said primary air passage, movement of said primary nozzle means constituting a signal transmitted through said connecting means to said second flap means to vary the area of said ejector nozzle, said signal transmitted to said second flap means and said aerodynamic loadings being the only actuating forces of said ejector nozzle structure.

13. A variable area exhaust for an aircraft jet engine as in claim 12 wherein said first and second flap means of said ejector nozzle structure are free to move relative to each other in response to movement of said primary nozzle means.

14. A variable area exhaust for an aircraft jet engine as in claim 12 wherein said aerodynamic loading includes changes in the relationship between pressures across said ejector nozzle structure, said first and second flap means moving together in response to said pressure changes.

References Cited

UNITED STATES PATENTS

| | | | |
|---|---|---|---|
| 3,214,904 | 11/1965 | Bailey et al. | 239—265.41 X |
| 3,367,579 | 2/1968 | Mehr | 239—265.39 X |
| 3,049,875 | 8/1962 | Horgan | 239—265.39 |

STANLEY H. TOLLBERG, *Primary Examiner.*